United States Patent
Buchholz et al.

(10) Patent No.: US 11,055,933 B2
(45) Date of Patent: Jul. 6, 2021

(54) METHOD FOR OPERATING A COMMUNICATION NETWORK COMPRISING A PLURALITY OF MOTOR VEHICLES, AND MOTOR VEHICLE

(71) Applicant: Audi AG, Ingolstadt (DE)

(72) Inventors: Jan Buchholz, Ergolding (DE); Sebastian Engel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 345 days.

(21) Appl. No.: 16/082,364

(22) PCT Filed: Feb. 28, 2017

(86) PCT No.: PCT/EP2017/054558
§ 371 (c)(1),
(2) Date: Sep. 5, 2018

(87) PCT Pub. No.: WO2017/153201
PCT Pub. Date: Sep. 14, 2017

(65) Prior Publication Data
US 2019/0066410 A1 Feb. 28, 2019

(30) Foreign Application Priority Data

Mar. 5, 2016 (DE) ...................... 10 2016 002 768.1

(51) Int. Cl.
*G07C 5/08* (2006.01)
*G08G 1/01* (2006.01)
(Continued)

(52) U.S. Cl.
CPC ....... *G07C 5/0808* (2013.01); *B60W 50/0205* (2013.01); *G07C 5/008* (2013.01);
(Continued)

(58) Field of Classification Search
CPC ........... G07C 5/08; G07C 5/00; B60W 50/02
See application file for complete search history.

(56) References Cited

U.S. PATENT DOCUMENTS

| 4,754,255 A | 6/1988 | Sanders et al. |
| 6,201,493 B1 | 3/2001 | Silverman |
| (Continued) | | |

FOREIGN PATENT DOCUMENTS

| CN | 1710434 A | 12/2005 |
| CN | 102101475 A | 6/2011 |
| (Continued) | | |

OTHER PUBLICATIONS

International Preliminary Report on Patentability directed to related International Patent Application No. PCT/EP2017/054558, dated Sep. 7, 2018, with attached English-language translation; 9 pages.

(Continued)

*Primary Examiner* — Kira Nguyen
(74) *Attorney, Agent, or Firm* — Sterne, Kessler, Goldstein & Fox P.L.L.C.

(57) ABSTRACT

A method for operating a communication network comprising a plurality of motor vehicles, wherein the motor vehicles each have a sensor device having at least one environmental sensor, wherein at least one motor vehicle, when a malfunction of an environmental sensor is found by its sensor device, transmits the status data describing the malfunction and including position data of the motor vehicle to at least one external evaluation device for determining interference area information describing an interference area for environmental sensors of the motor vehicles.

16 Claims, 2 Drawing Sheets

(51) Int. Cl.
  *G07C 5/00*      (2006.01)
  *G08G 1/16*      (2006.01)
  *G08G 1/0967*    (2006.01)
  *B60W 50/02*     (2012.01)

(52) U.S. Cl.
  CPC ..... *G08G 1/0112* (2013.01); *G08G 1/096783* (2013.01); *G08G 1/096791* (2013.01); *G08G 1/163* (2013.01); *B60W 2050/0215* (2013.01); *B60W 2556/50* (2020.02); *B60W 2556/65* (2020.02)

(56) References Cited

U.S. PATENT DOCUMENTS

| | | | |
|---|---|---|---|
| 6,611,227 | B1 | 8/2003 | Nebiyeloul-Kifle et al. |
| 7,187,321 | B2 | 3/2007 | Watanabe et al. |
| 7,647,146 | B2 | 1/2010 | Taki |
| 2003/0043059 | A1* | 3/2003 | Miller, Jr. ............... G01C 21/26 340/989 |
| 2004/0203461 | A1 | 10/2004 | Hay |
| 2005/0065711 | A1 | 3/2005 | Dahlgren et al. |
| 2006/0176169 | A1 | 8/2006 | Doolin et al. |
| 2010/0250106 | A1* | 9/2010 | Bai ........................ G08G 1/161 701/117 |
| 2011/0130947 | A1 | 6/2011 | Basir |
| 2011/0153145 | A1 | 6/2011 | Kettenacker |
| 2012/0089299 | A1* | 4/2012 | Breed ..................... B60N 2/888 701/36 |
| 2014/0236414 | A1* | 8/2014 | Droz ...................... G08G 1/166 701/28 |
| 2015/0061929 | A1* | 3/2015 | Lim ........................ G01S 7/003 342/26 R |
| 2015/0066412 | A1 | 3/2015 | Nordbruch |
| 2015/0328986 | A1 | 11/2015 | Nordbruch |
| 2017/0129496 | A1* | 5/2017 | Li ......................... B60W 50/0097 |
| 2019/0066410 | A1 | 2/2019 | Buchholz et al. |

FOREIGN PATENT DOCUMENTS

| | | | |
|---|---|---|---|
| CN | 102139700 | A | 8/2011 |
| CN | 203739791 | U * | 7/2014 |
| CN | 104821888 | A | 8/2015 |
| DE | 602004009683 | T2 | 8/2008 |
| DE | 102007041202 | A1 | 3/2009 |
| DE | 102009019075 | A1 | 10/2010 |
| DE | 102010054214 | A1 | 6/2012 |
| DE | 102011082123 | A1 | 3/2013 |
| DE | 102011084264 | A1 | 4/2013 |
| DE | 102013226631 | A1 | 6/2015 |
| DE | 102015202837 | A1 | 8/2015 |
| EP | 1909236 | A2 | 4/2008 |
| EP | 2924662 | A1 | 9/2015 |
| EP | 3398181 | B1 | 5/2019 |
| GB | 2524393 | A | 9/2015 |
| JP | 2008230467 | A | 10/2008 |
| WO | WO 2014/047250 | A1 | 3/2014 |
| WO | WO 2016/032780 | A1 | 3/2016 |
| WO | WO 2017/153201 | A1 | 9/2017 |

OTHER PUBLICATIONS

English-language Abstract of German Patent Application Publication No. DE 102007041202 A1, published Mar. 5, 2009; 2 pages.
English-language Abstract of German Patent Application Publication No. DE 102009019075 A1, published Oct. 28, 2010; 1 page.
English-language Abstract of German Patent Application Publication No. DE 102010054214 A1, published Jun. 14, 2012; 5 pages.
English-language Abstract of German Patent Application Publication No. DE 102013226631 A1, published Jun. 25, 2015; 5 pages.
International Search Report and Written Opinion directed to related International Patent Application No. PCT/EP2017/054558, dated Jun. 23, 2017, with attached English-language translation; 26 pages.

* cited by examiner

METHOD FOR OPERATING A COMMUNICATION NETWORK COMPRISING A PLURALITY OF MOTOR VEHICLES, AND MOTOR VEHICLE

TECHNICAL FIELD

This disclosure relates to a method for operating a communication network comprising a plurality of motor vehicles, wherein the motor vehicles each have a sensor device having at least one environmental sensor.

BACKGROUND

Such methods normally realize a vehicle-to-vehicle communication via the communication network, warning other motor vehicles in the communication network of dangerous weather-induced hazards such as black ice, for instance, or reduced visibility due to heavy rain or fog. Sensor data from an environmental sensor of the sensor device may also be used for detecting reduced visibility.

DE 10 2010 054 214 A1 discloses a method for supporting a driver driving a motor vehicle using a driver assistance system, wherein sensor data from the environment of the motor vehicle are recorded using a sensor device. If the driver assistance system detects an error during provision of a functionality, the error being based on an erroneous interpretation of the sensor data, error data that characterize the erroneous interpretation, and position data associated with the error data, are stored in a memory device and transmitted to a further vehicle or to a remote processing station.

However, such a method only permits the driver assistance system to derive interpretation errors for avoiding repetition of interpretation errors that have already occurred. Other types of errors that could have a negative effect on the reliability of the driver assistance system are not taken into account, however.

DE 10 2011 082 123 A1 discloses a method for operating a vehicle in which a query from the processing unit of a vehicle, which query contains information about a vehicle component and about the target area of the vehicle, is transmitted to an external processing unit. Information about a limitation in the vehicle component in the target region is then transmitted from the external processing unit to the processing unit of the vehicle, wherein the processing unit takes the information into account when operating the vehicle and/or outputs it to a driver. Thus, the processing unit of the vehicle and the driver receive information about a functional limitation of the vehicle component to be expected in the target area.

BRIEF DESCRIPTION OF THE DRAWINGS/FIGURES

The accompanying drawings, which are incorporated herein and form part of the specification, illustrate the present embodiments and, together with the description, further serve to explain the principles of the present embodiments and to enable a person skilled in the relevant art(s) to make and use the present embodiments.

Figure 1:
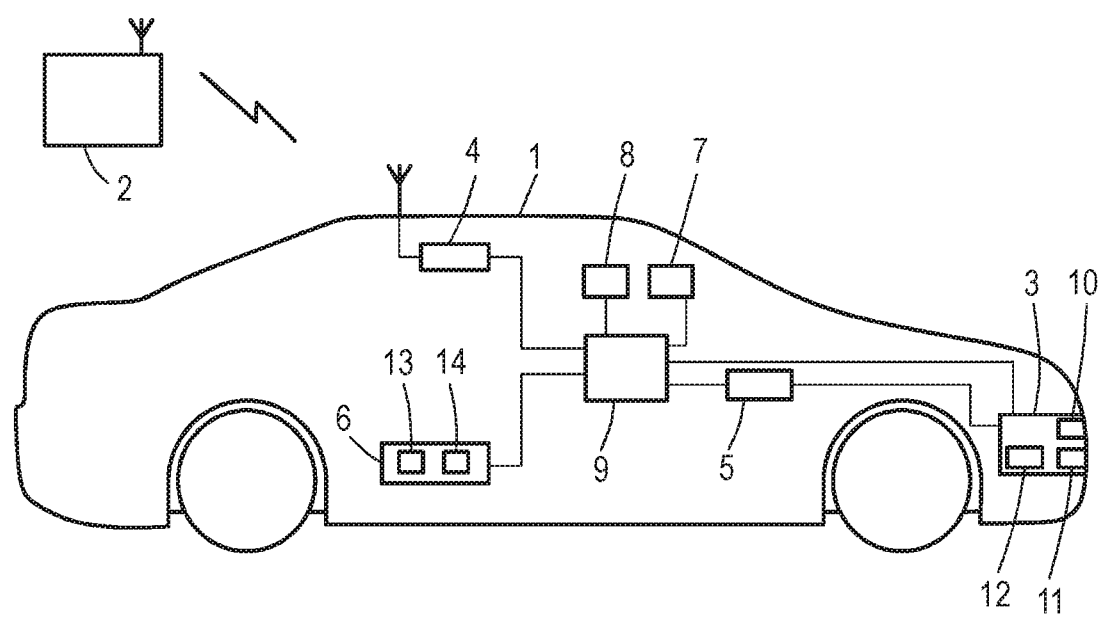
FIG. 1 is a schematic diagram of an external stationary evaluation device, according to some embodiments, and an exemplary embodiment of a motor vehicle communicating with the stationary evaluation device.

The features and advantages of the present embodiments will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

The underlying object of the invention is to improve, based on a communication network comprising a plurality of motor vehicles, the reliability of the operation of a driver assistance system in motor vehicles in a communication network.

To attain this object, a method provides that a motor vehicle, when a malfunction of an environmental sensor is found by its sensor device, transmits status data describing the malfunction, including position data of the motor vehicle, to at least one external evaluation device for determining interference area information describing an interference area for respective environmental sensors of the motor vehicles in the communication network. This interference area information may be applicable to the respective environmental sensors of the motor vehicles that may travel through the same interference area.

This disclosure is based on the consideration of evaluating a malfunction of an environmental sensor found by the sensor device itself for determining a local interference area. The sensor device preferably provides sensor data for an assistance system of the motor vehicle. The sensor device of the motor vehicle may, for instance, continuously and/or regularly determine an operating status of its environmental sensor using an onboard diagnostic device. Data describing this operating status, particularly the existence of a malfunction, may then be merged with position data provided by a position-detecting device of the motor vehicle to create the status data. The position of the motor vehicle at which the malfunction was found may usefully be derived from the position data describing, in particular, geographic coordinates of this position. When a malfunction is determined, the status data are preferably transmitted to the external evaluation device using a communication device of the motor vehicle. The evaluation device is therefore disposed outside of the motor vehicle whose sensor device finds the malfunction, and is a part of the communication network.

Transmission of the status data facilitates determination of an interference area by the evaluation device, in that an occurrence of the malfunction in the environmental sensor or identical and/or similar environmental sensors of other motor vehicles can be anticipated. In particular, this interference area is produced by an interference source. The interference source may be described as a cohesive geographic area and/or as a segment of a traffic route along which the occurrence of the malfunction may be anticipated.

The method therefore permits, within the communication network, the provision of status data that describe a malfunction of an environmental sensor found by the sensor device itself to detect interference areas in which there may be a negative effect on the functionality of environmental sensors. A possible functional limitation of driver assistance systems that evaluate the sensor data of such environmental sensors may therefore be estimated even prior to the occurrence of the functional limitation, so that the driver assistance system may advantageously be operated with greater reliability.

In one advantageous refinement of the method, the status data are transmitted to at least one other motor vehicle having the evaluation device. The communication network therefore permits direct communication between individual motor vehicles. To this end, a standard for wireless networks is used, in particular automotive WLAN according to the IEEE 802.11p standard. A broadcast transmission to other motor vehicles in the communication network is also possible. Usefully, transmission is made only to motor vehicles within a definable relevance area around the transmitting motor vehicle, for example, within a radius of one kilometer.

Alternatively or in addition, the status data may be transmitted to a stationary evaluation device of the communication network. This stationary evaluation device may be embodied, in particular, as a backend server, that is, a central processing and communication device. Data transmission between the motor vehicles in the communication network and the stationary evaluation device is preferably accomplished via a mobile network, for example GPRS, UMTS, LTE, or comparable transmission standards. The stationary evaluation device may transmit the interference area information to at least one motor vehicle in the communication network. In particular, the transmission is also accomplished from the stationary evaluation device to the motor vehicles as described in the foregoing. The stationary evaluation device preferably transmits the interference area information only to motor vehicles within the definable relevance area.

In the method, it is particularly preferred that the evaluation device determines, from a plurality of received status data, each describing a malfunction, interference area information describing local distribution of the occurrence of malfunctions. The status data here may be transmitted by the same or different motor vehicles, so that the limits of the interference area may be determined using the position data. In particular, the local distribution may describe individual concentration regions (so-called "hotspots") or a surface-area focused frequency of the occurrence of malfunctions, particularly linked to geodetic map information (so-called "heat map"). In this way, the status data of a plurality of motor vehicles are linked for determining the interference area information so that the evaluation device uses the "swarm intelligence" of the motor vehicles in the communication network.

In addition, for determining the interference area information, in the method it is advantageous when the evaluation device takes into account the point in time at which the time data describing the malfunctions are found. The time data may be transmitted merged with the status data by the motor vehicle, for example as a time stamp, or may be generated as a function of the time at which the evaluation device receives the status data. In this way, it is possible, in particular, to detect whether an interference source causing an interference area has ceased to exist if no status data describing a malfunction have been received over a prolonged period of time. In addition, temporal interference patterns of the interference source may be determined, supplementing the interference area information.

To attain particularly high quality interference area information, method may provide that the evaluation device conducts a plausibility check of the interference area information using received status data describing proper functioning of the sensor device and/or using geodata describing the interference area and/or the surroundings of the interference area. As stated in the foregoing, status data describing proper functioning of the sensor device, preferably merged with the position data, may also be transmitted to the evaluation device. In this way, it may be determined that a malfunction found by a motor vehicle can be traced back to an interference internal to and affecting the motor vehicle if other motor vehicles do not find a malfunction at the same position or a position nearby. For the plausibility check, geodata, preferably a geodata device linked to the evaluation device, may also be used. If it may be found from these geodata that an interference source, for instance a transmitter, is disposed in the vicinity of an interference area or a potential interference area, it may be presumed that this interference source is producing the interference area.

In the method, it is also especially useful when the evaluation device classifies the interference area information according to the cause of the malfunction, especially whether it is temporary or permanent. Temporarily occurring causes of an interference area may be, for example, weather phenomena such as fog or rain, rock slides, or soiling of the environmental sensor, which soiling may be caused, for example, by a soiled roadway or by a soiled vehicle driving further ahead in traffic, such as an agricultural vehicle. Optical environmental sensors are particularly strongly affected by soiling, for example.

Permanent sources of an interference area may, in particular, be electromagnetic fields generated by strong transmitters, such as cell towers, or in the region of airports. Such electromagnetic fields may, in particular, interfere with radar-based environmental sensors. The previously described geodata or time data may also preferably be taken into account during classification.

Finally, in the context of the method, it is particularly preferred that at least one motor vehicle evaluates the interference area information for outputting occupant information indicating arrival in, or impending arrival in, the interference area, especially about potential interferences to a vehicle system that is evaluating sensor data of an affected environmental sensor. Occupants of motor vehicles approaching the interference area are thus predictively informed about possible interference to the vehicle system, especially a driver assistance system. A driver may thus adjust to the knowledge that he cannot use certain a vehicle system upon reaching the interference area, which further increases the reliability of such a vehicle system.

In addition, this disclosure relates to a motor vehicle having a sensor device having at least one environmental sensor, a communication device for communicating with at least one evaluation device of a communication network comprising a plurality of motor vehicles, and a control device embodied for performing the method. The motor vehicle may also have an onboard evaluation device that is embodied for determining interference region information from status data received by means of the communication device from other motor vehicles in the communication network. All embodiments for the method may be applied analogously to the motor vehicle so that the aforesaid advantages may also be attained therewith.

Additional advantages and details result from the exemplary embodiments described in the following and using the drawings.

Figure 2:
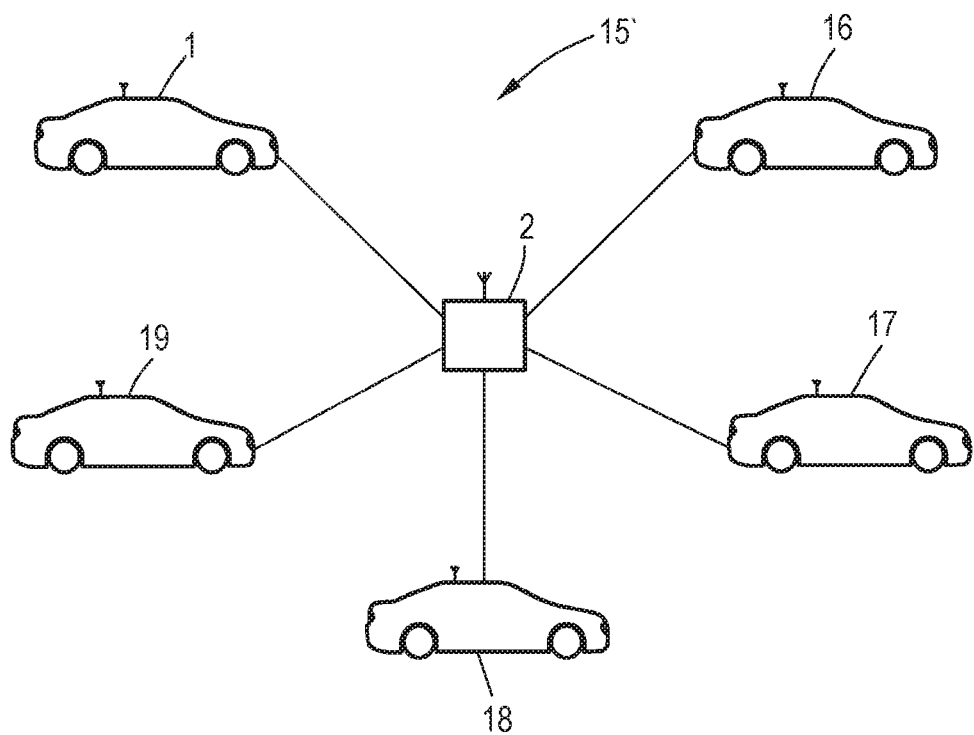
FIG. 2 is a schematic diagram of an example of a communication network comprising the motor vehicle depicted in FIG. 1.
Figure 3:
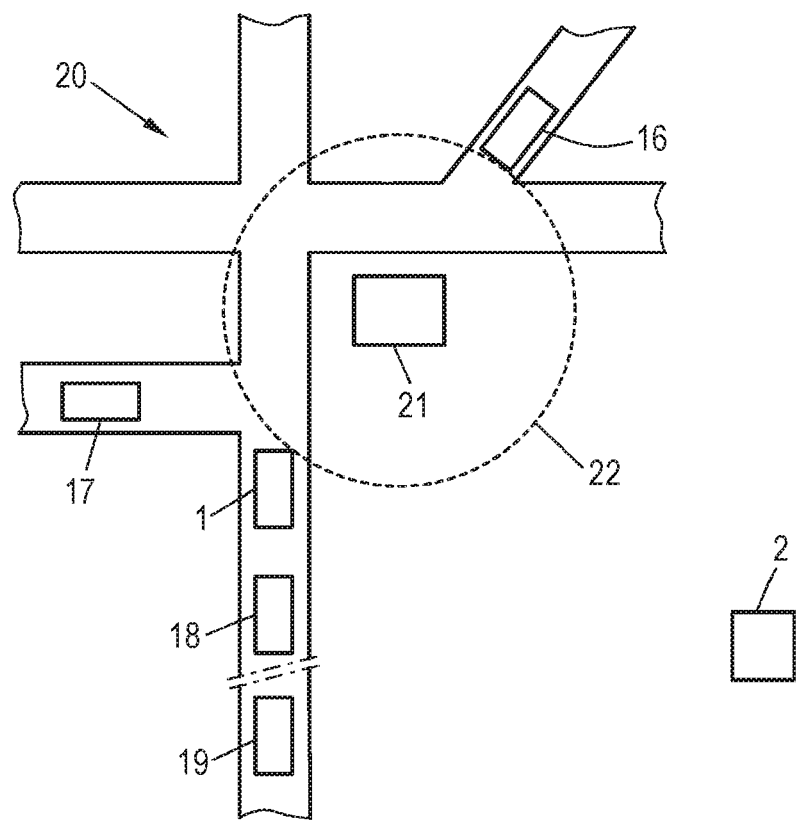
FIG. 3 is a schematic diagram of a road system having an interference source, according to some embodiments.
Figure 4:
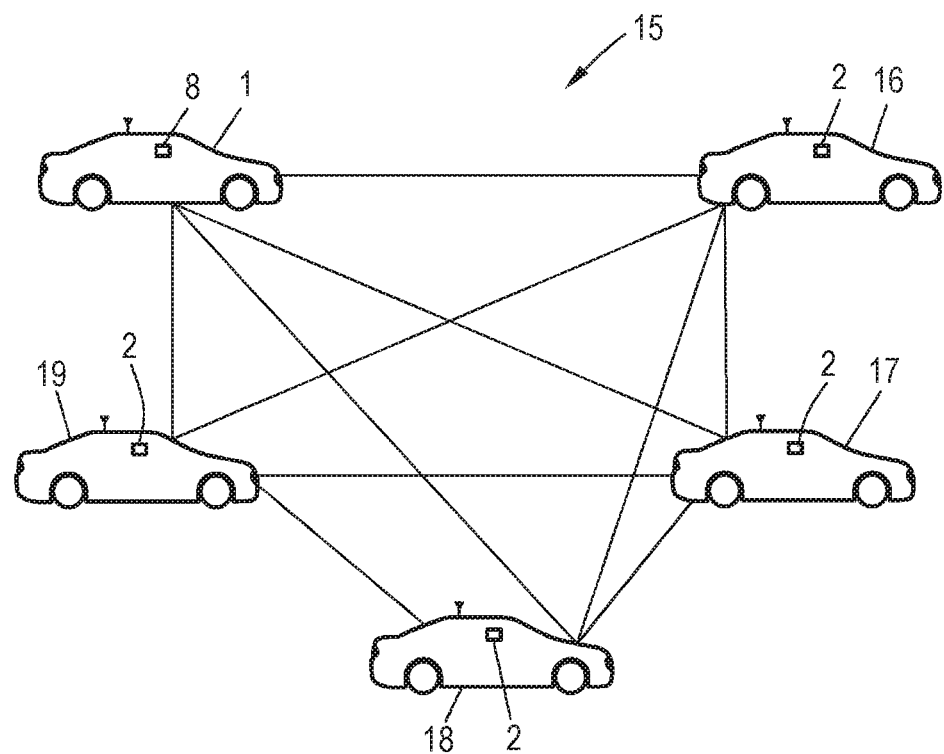
FIG. 4 is a schematic diagram of another example of a communication network comprising the motor vehicle depicted in FIG. 1.

FIG. 1 is a schematic diagram of an external stationary evaluation device according to some embodiments, and an exemplary embodiment of a motor vehicle communicating with the stationary evaluation device;

FIG. 2 is a schematic diagram of an example of a communication network comprising the motor vehicle depicted in FIG. 1;

FIG. 3 is a schematic diagram of a road system having an interference source according to some embodiments; and FIG. 4 is a schematic diagram of another example of a communication network comprising the motor vehicle depicted in FIG. 1.

FIG. 1 is a schematic diagram of an exemplary embodiment of a motor vehicle 1. In addition, FIG. 1 provides a schematic depiction of an external stationary evaluation device 2. The motor vehicle 1 comprises a sensor device 3, a communication device 4, a vehicle system 5 in the form of a driver assistance system, a navigation device 6, a visual and acoustic output device 7, and an onboard evaluation device 8, each of which has a data connection to a control device 9 of the motor vehicle 1. For its part, the stationary evaluation device 2 comprises a communication device (not shown) or is connected to a communication device (not shown) via which the stationary evaluation device 2 communicates with the motor vehicle 1.

The sensor device 3 comprises an environmental sensor 10, embodied as a radar sensor, and an environmental sensor 11, embodied as an optical sensor. According to further exemplary embodiments of the motor vehicle 1, the sensor device 3 has additional or alternative environmental sensors 10, 11, such as additional radar sensors, additional optical sensors (cameras, LIDAR sensors, etc.), or ultrasound sensors. The sensor device 3 furthermore has a diagnostic device 12, via which a malfunction of an environmental sensor 10, 11 may be found and a malfunction signal may be generated. The vehicle system 5 can be a driver assistance system that, to satisfy its assistance functions, evaluates sensor data from the sensor device 3, wherein the functioning of the vehicle system 5 can be negatively impacted if there is a malfunction in environmental sensors 10, 11.

The communication device 4 is embodied for communicating with the external stationary evaluation device 2 using a mobile network standard such as GPRS, UMTS, or LTE, or a wireless network standard such as automotive WLAN according to the IEEE 802.11p standard.

The navigation device 6 comprises a position detecting device 13, via which an instantaneous position of the motor vehicle 1 may be determined via a global satellite navigation system, such as GPS or Galileo, and via which the position data describing the position may be provided. In addition, the navigation device 6 has a geodata device 14 in which geodata are stored in the form of digital cards.

FIG. 2 depicts an example of a communication network 15' comprising the motor vehicle 1 shown in FIG. 1 and four additional motor vehicles 16-19. The motor vehicles 16-19 are embodied similar to the motor vehicle shown in FIG. 1, that is, they have components having the same functions as the components described in the foregoing for the motor vehicle 1. The motor vehicles 1, 16-19 can communicate with an external stationary evaluation device 2 in the form of a backend server via a mobile network standard. In this case, the onboard evaluation device 8 of the motor vehicles 1, 16-19 is not necessary.

FIG. 3 is a schematic diagram, not true to scale, of a road system 20 having an interference source 21, the external stationary evaluation device 2, and the motor vehicles 1, 16-19 forming the communication network 15'. The control device 9 of the motor vehicle 1 is embodied for performing a method for operating the communication network 15', wherein one exemplary embodiment of this method is explained in greater detail in the following using FIG. 3.

In a first step, the diagnostic device 12 of the sensor device 3 determines an operating status of the environmental sensors 10, 11, and provides the control device 9 status data describing the existence of a malfunction of one of the environmental sensors 10, 11. In a following step, these status data are merged by the control device 9 with position data, describing the instantaneous position of the motor vehicle 1 and provided by the position detecting device 13 of the navigation device 6, as well as with the point in time for the time data describing determination of the operating status. The status data thus form a data set from information about whether and with which environmental sensor 10, 11 there is a malfunction, geographic coordinates of the location of the motor vehicle 1 where the operating status was determined, and a time stamp. Then the status data are provided to the communication device 4, which transmits them to the stationary evaluation device 2 according to the mobile network standard. In another exemplary embodiment, the stationary evaluation device 2 adds the time data to the status data using the time of receipt.

In this case, the interference source 21 is, for example, a radar system of an airport whose strong electromagnetic transmission pulses interfere with the environmental sensor 10 embodied as a radar sensor. If the motor vehicle 1 approaches the interference source 21, the diagnostic device 12 detects this interference, which is expressed in a malfunction of the environmental sensor 10. Thus, before the interfering effect of the interference source 21, status data that describe a proper functioning of the environmental sensors 10, 11 are transmitted to the stationary evaluation device 2 and as the interference source 21 is approached, the status data describing the malfunction of the environmental sensor 10 are transmitted to the stationary evaluation device 2. If the motor vehicle 1 has again moved in the road system 20 far enough from the interference source 21 that the environmental sensor 10 functions properly, the status data describing the proper functioning of the environmental sensors 10, 11 are transmitted again.

Similarly, the other motor vehicles 16-19 also transmit corresponding status data to the stationary evaluation device 2. Thus, an environmental sensor of the motor vehicle 16 also experiences interference from the interference source 21 approximately simultaneously with the motor vehicle 1 at a different location in the road system 20 and transmits corresponding status data with position data and time data to the stationary evaluation device 2.

The stationary evaluation device 2 then determines interference area information describing an interference area 22 for radar sensors of the motor vehicles 1, 16-19. To this end, the stationary evaluation device 2 takes into account the specific position data to determine the geographic extent of the interference area 22 and the local distribution of the occurrence of malfunctions in the interference area 22. In addition, the stationary evaluation device 2 performs a plausibility check of the interference area information using the received status data describing proper functioning of environmental sensors 10, 11 and using geodata describing the interference area 22 and its surroundings. These geodata are available to the stationary evaluation device 2 embodied as a backend server, and in this case describe that the airport with the interference source 21 is located in physical proximity to the interference area 22. Thus, it is possible to conclude, from the physical proximity of the airport to the interference area 22 and from the temporal and spatial relationship of malfunctions in the motor vehicles 1, 16, that the malfunction is not a sporadic malfunction caused by one of the motor vehicles 1, 16 itself, but rather is an external interference from the interference source 21.

Moreover, the stationary evaluation device 2 classifies the interference area information as to whether it is a temporary or permanent cause of the malfunctions. To this end, it evaluates status data from a large number of motor vehicles (not shown in FIG. 3) over a prolonged period of time and additionally takes into account the geodata, which in the present case speak in favor of a permanent interference source 21 caused by the airport. In this context, sources may also be, for example, weather conditions that occur, limited temporally or locally, such as precipitation or fog, or soiling on the motorway, for example, from agricultural vehicles, which sources have a particularly negative effect on the environment sensor 11 embodied as an optical sensor.

With respect to the description of the local distribution of the occurrence of malfunctions by the interference area information, the stationary evaluation device 2 determines local concentration areas of the occurrence, so-called hotspots, wherein the interference area 22 is also characterized as a so-called heat map that describes the local frequency of the occurrence of malfunctions. The stationary evaluation device 2, taking into account the geodata, extrapolates the spatial extension of the interference area 22 around the interference source 21, because typically no status data occur regarding locations in the interference area 22 outside of the road system 20. In an alternative embodiment, the interfering information merely describes segments of the road system 20 in which malfunctions occur.

The stationary evaluation device 2 transmits the interference area information, after it has been determined, to all motor vehicles 17, 18 within a defined relevance region of, in this case, one kilometer around the interference area 22. In the present case, the motor vehicle 19 is still far enough from the interference area 22 that the interference area information has not yet been transmitted and will not be transmitted until the relevance region is reached. The motor vehicles 17, 18 receive the interference area information by means of their communication device 4, whereupon the control device 9 activates the output device 7 for outputting a visual and acoustic warning to the respective driver of the motor vehicle 17, 18 about soon reaching the interference area 22 and a possible negative effect on the functioning of the vehicle system 5.

If the stationary evaluation device 2, using status data from motor vehicles (not shown here) reaching the interference area 22 later, determines that no further malfunctions are occurring in the interference area 22, the stationary evaluation device 2 stops transmitting the interference area information.

FIG. 4 depicts an example of another communication network 15 comprising the motor vehicles 1, 16-19. This communication network is operated according to a further exemplary embodiment of the method, wherein the motor vehicles 1, 16-19 communicate directly with one another. As shown in FIG. 4, each has an external evaluation device 2 onboard the motor vehicles, and the motor vehicle 1 has an onboard evaluation device 8, as depicted equivalently to FIG. 1. Automotive WLAN according to the IEEE 802.11p standard, or alternatively a broadcasting method, can be used for this communication. Otherwise, the communication network 15 can be operated analogously to the communication network 15', wherein the interference area information here is not determined using a stationary backend server, but rather using each of the evaluation devices 2, 8 of the respective motor vehicles 1, 16-19, which obtain the status data from each of the other motor vehicles 1, 16-19. In another exemplary embodiment, the architectures of the communication networks 15, 15' are combined to create a mixed communication network having both a stationary evaluation device 2 and evaluation devices 2, 8 installed in the respective motor vehicles 1, 16-19.

The invention claimed is:

1. A method for operating a communication network comprising a plurality of motor vehicles, wherein each of the plurality of motor vehicles has a sensor device having at least one environmental sensor, the method comprising:
    detecting, by a respective sensor device of a first motor vehicle of the plurality of motor vehicles, an occurrence of a malfunction of a respective environmental sensor of the respective sensor device;
    transmitting, by the first motor vehicle, in response to the detecting, status data describing the malfunction and including position data of the first motor vehicle to an external evaluation device;
    determining, by the external evaluation device, interference area information describing an interference area for the respective environmental sensor of the first motor vehicle; and
    identifying, by the external evaluation device, an interference source that emits signals and is causing the malfunction by accessing geodata describing the interference area or surroundings of the interference area; and
    transmitting, by the external evaluation device, the interference area information and interference source information to at least one receiving motor vehicle of the plurality of motor vehicles of the communication network.

2. The method of claim 1, further comprising:
    evaluating, by the at least one receiving motor vehicle of the plurality of motor vehicles, the interference area information for outputting occupant information indicating arrival in, or impending arrival in, the interference area.

3. The method of claim 2, wherein the occupant information comprises potential interferences to a respective vehicle system, of the at least one receiving motor vehicle, that is evaluating sensor data of an affected environmental sensor.

4. The method of claim 1, wherein the external evaluation device is a stationary evaluation device of the communication network.

5. The method of claim 4, wherein the stationary evaluation device is a backend server.

6. The method of claim 1, wherein the external evaluation device is an onboard evaluation device of a second motor vehicle of the plurality of motor vehicles.

7. The method of claim 1, wherein the interference area information describes local distribution of the occurrence of the malfunction.

8. The method of claim 1, wherein determining the interference area information includes:
    using, by the external evaluation device, a point in time at which a time data describing the malfunction is found.

9. The method of claim 1, further comprising:
    conducting, by the external evaluation device, a plausibility check of the interference area information using the status data, wherein the status data describes functioning of the respective sensor device of the first motor vehicle.

10. The method of claim 1, further comprising:
conducting, by the external evaluation device, a plausibility check of the interference area information using the geodata describing the interference area or surroundings of the interference area.

11. The method of claim 1, further comprising:
classifying, by the external evaluation device, the interference area information according to a cause of the malfunction.

12. The method of claim 11, further comprising:
classifying, by the external evaluation device, the cause of the malfunction as temporary or permanent.

13. A system, comprising:
a server device comprising at least one external evaluation device of a communication network comprising a plurality of motor vehicles; and
a motor vehicle comprising:
  a sensor device comprising at least one environmental sensor,
  a communication device communicatively coupled to the at least one external evaluation device,
  a vehicle system,
  an onboard evaluation device, and
  a control device, wherein the control device is configured to authorize the motor vehicle to:
    detect, by the sensor device, an occurrence of a malfunction of the at least one environmental sensor;
    transmit, by the communication device, in response to the detecting, status data describing the malfunction and including position data of the motor vehicle to the at least one external evaluation device; and
    receive, by the communication device, from the at least one external evaluation device, interference area information describing an interference area for the at least one environmental sensor, wherein the interference area comprises an area proximate an interference source,
  wherein the at least one external evaluation device is configured to determine the interference source using geodata describing the interference area or surroundings of the interference area.

14. The system of claim 13, wherein the control device is further configured to authorize the motor vehicle to:
transmit, by the onboard evaluation device, the interference area information to at least one receiving motor vehicle of the plurality of motor vehicles of the communication network.

15. The system of claim 13, wherein the control device is further configured to authorize the motor vehicle to:
evaluate, by the vehicle system, the interference area information for outputting occupant information, indicating arrival in, or impending arrival in, the interference area.

16. The system of claim 15, wherein the occupant information comprises potential interferences to the vehicle system that is evaluating sensor data of an affected environmental sensor of the at least one environmental sensor.

* * * * *